(No Model.)
W. C. JONES & W. S. ROGERS.
FRICTION CLUTCH.
No. 378,448. Patented Feb. 28, 1888.
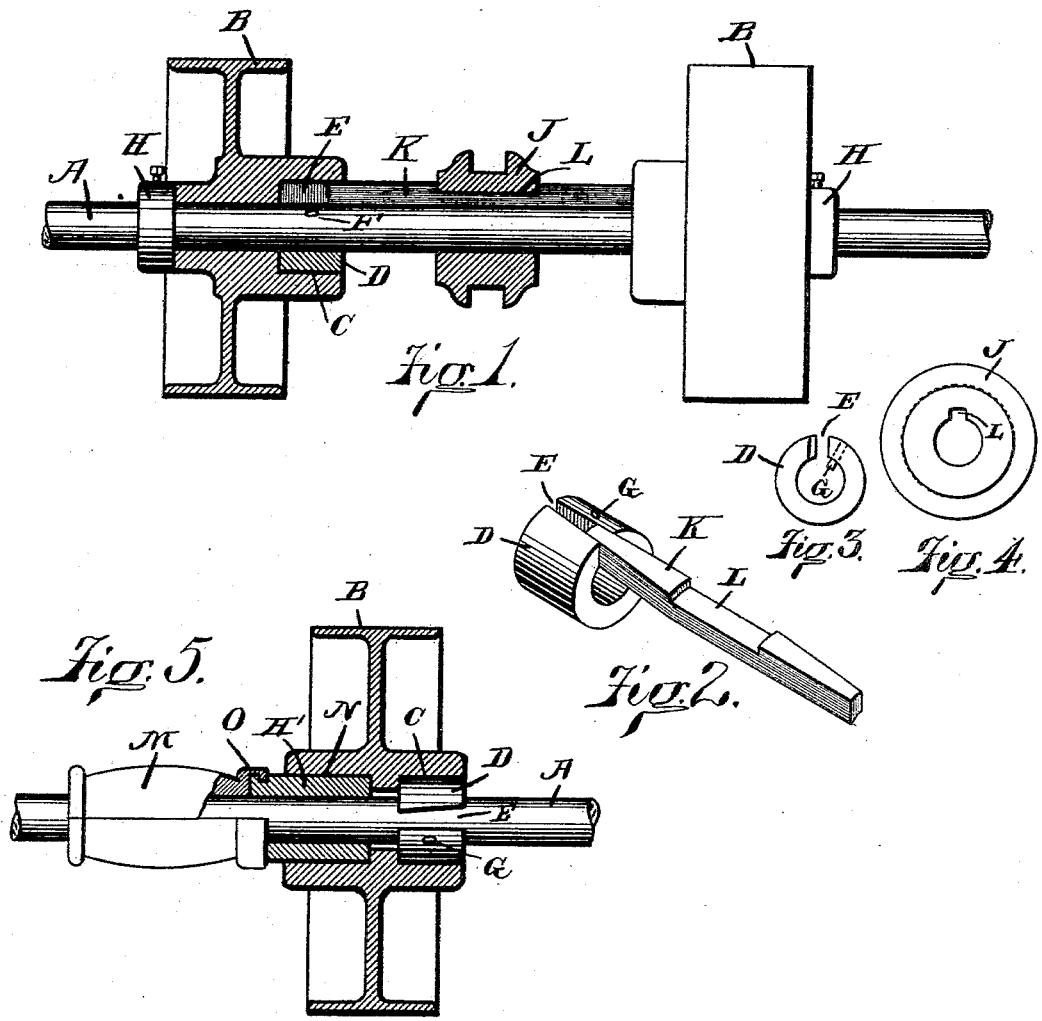
Witnesses:
W. A. Seward.
C. A. Fisher.
Willis C. Jones.
Winfield S. Rogers.
Inventors.
by James W. See,
Attorney.

UNITED STATES PATENT OFFICE.

WILLIS C. JONES AND WINFIELD S. ROGERS, OF CINCINNATI, OHIO.

FRICTION-CLUTCH.

SPECIFICATION forming part of Letters Patent No. 378,448, dated February 28, 1888.

Application filed October 15, 1887. Serial No. 252,413. (No model.)

*To all whom it may concern:*

Be it known that we, WILLIS C. JONES and WINFIELD S. ROGERS, of Cincinnati, Hamilton county, Ohio, have invented certain new and useful Improvements in Friction-Clutches, of which the following is a specification.

Our improvements have reference to friction-clutches to be employed in cases where pulleys or gears are to be engaged or disengaged from shafting at will.

The improvements will be readily understood from the following description, taken in connection with the accompanying drawings, in which—

Figure 1 is a side elevation of a piece of shafting provided with two pulleys fitted with our improved friction-clutching device, one of the pulleys appearing in elevation, while the other pulley and its clutching accessories appear in vertical diametrical section; Fig. 2, a perspective view of the friction-ring and its operating-wedge; Fig. 3, a face view of the friction-ring; Fig. 4, a face view of the wedge-shifting collar; and Fig. 5, a vertical diametrical section of a pulley similar to those appearing in Fig. 1, except that in the case of Fig. 5 the pulley is arranged to run upon a fixed nosing instead of upon the shaft, the object being to adapt the device for use on line-shafts and similar situations where the wear of the pulley upon the shaft is objectionable.

In the drawings, A represents a shaft; B, a pulley thereon, but fitted to revolve independently thereof, two such pulleys appearing in Fig. 1; C, a concentric counterbore in the face of the hub of the pulley and having a diameter about twice the diameter of the shaft; D, an integral friction-ring fitting upon the shaft within said counterbore, the exterior of the ring being a trifle smaller than the bore of the counterbore, so that the pulley is free to revolve on the friction-ring; E, a wedge-shaped longitudinal cut or gap entirely through the metal of the friction-ring; F, a pin-hole in the shaft at the place where the friction-ring is located; G, a pin through the metal of the friction-ring to one side of its gap, this pin engaging the hole F and serving as a means by which the friction-ring is secured to the shaft against endwise or rotary motion thereof; H, a collar on the shaft and abutting on the pulley-hub, and serving to prevent the movement of the pulley away from the friction-ring, this collar differing in Figs. 1 and 5, as hereinafter explained, its office, as above indicated, however, being the same in both cases; J, a wedge-shifting collar, the same consisting of a collar fitted for free sliding motion on the shaft, and provided with a groove by means of which the collar may be moved on the shaft through the instrumentality of ordinary collar shifting apparatus; K, a wedge lying parallel with the shaft and attached to the wedge-shifting collar and projecting outwardly therefrom into the gap in the friction-ring, the lower or inner surface of this wedge lying directly upon the shaft, while the upper or outer surface of the wedge comes substantially even with the outer surface of the friction-ring, the end of the wedge being of such shape as to fit within the tapering gap of the friction-ring when forced therein, and thereby produce a widening of this gap and consequent enlargement of the diameter of the friction-ring, the wedge K in Fig. 1 appearing as double-ended—that is, projecting from both sides of the wedge-shifting collar to serve in operating the friction-ring of either pulley where the pulleys are used in pairs; L, a pair of notch-seats by which the wedge is secured to the wedge-shifting collar, and having a depth about half the depth of the wedge, while the other notch-seat is formed transversely in the top of the wedge and has a depth equal to the length of the wedge-shifting collar; M, in Fig. 5 only, an ordinary journal-box, such as is commonly employed in connection with a suitable hanger or bracket, in connection with line-shafts; N, in Fig. 5 only, a counterbore in the rear hub of the pulley, of a diameter to form an accurate running fit upon the exterior of the collar H', which in such case is prolonged inwardly into such counterbore; and O, in Fig. 5 only, peripheral tongue and grooving in the end of the journal-box M, engaging intermembering parts upon the outer end of the collar H'.

Fig. 1 may be taken as illustrating, for instance, the counter-shaft of a lathe, provided with two pulleys, which may be turned or run in opposite directions, both pulleys running normally idle upon the stationary shaft. In this case the pulleys have a running bearing upon the counter-shaft, and the pulleys are of course to be provided with the usual oil-holes. The friction-rings form fixed collars upon one side of the pulleys, while the collars H form fixed collars upon the other side of the pulleys, whereby endwise motion of the pulleys is prevented. Normally the wedges, while entering slightly the gaps of the friction-rings, do not spread the friction-rings open. By shifting the wedge toward the left it will open the friction-ring of the pulley at the left and cause the ring to tightly engage the counterbore C of that pulley, whereby the pulley becomes firmly locked to the shaft, thus causing the shaft to revolve with the pulley, while the other pulley, B, revolves loosely upon the shaft. If the wedge be shifted to the extreme right, it will be withdrawn from the collar of the left-hand pulley, and will open the collar of the right-hand pulley, thus locking the right-hand pulley to the shaft and permitting the other pulley to run idly upon the shaft. The pulleys are to be such distance apart with reference to the length and throw of the wedge that when the wedge is projected clear into the gap of one friction-ring it will not be entirely withdrawn from the gap of the other friction-ring. The notch-seating of the wedge and wedge-shifting ring, in connection with the wedge lying directly against the shaft, forms a simple and firm connection between these parts, and the ends of the wedge are steadied by their engagements within the counterbores in the pulleys. It is to be understood, of course, that if the device is used in connection with one pulley only, much of the unneeded projecting end of the wedge may be left off.

It is, of course, obvious that the pulleys, instead of having plain faces to receive or transmit motion from or to a running belt, may be toothed, in which case they become toothed gears. In other words, it is immaterial to our device whether what we show and treat as pulleys are pulleys in fact or gears. In the counter-shaft arrangement referred to in connection with Fig. 1, it is obvious that a certain amount of wear will occur where the pulleys run upon the counter-shaft. In counter-shafts this is not such a very serious matter, as these counter-shafts may be looked upon as normally-stationary shafts upon which the pulleys run, the shafts revolving only when the pulley is clutched to the shaft; but in the case of revolving line-shafts this wearing of the shafts is very objectionable, for the reason that it wears small spots in the shaft at places where the clutch-pulleys may be set, and, furthermore, as the shaft continuously revolves, while the pulley stands normally motionless, with the strain of the pulley upon it, the bore of the pulley would be worn at the side which meets the strain, thus producing an irregular bore. For these reasons provision is made by which these wearing effects may be avoided. This arrangement will be understood from inspecting Fig. 5. In this case the pulley does not bear at all upon the shaft, but runs upon the stationary collar, which projects from one of the shaft-boxes into the rear counterbore of the pulley. This projecting collar may be formed integrally with the shaft-boxes, though it will be found preferable to make the collar separate from the boxes, in case the boxes are split boxes, as is very common, and unite the collar to the box by a tongue-and-groove arrangement, as illustrated in Fig. 5. This permits the ready substitution of new collars, as a compensation for wear, without the necessity for renewing the entire shaft-box.

We claim as our invention—

1. In friction-clutches, the combination, substantially as set forth, of a pulley having a bore to fit its shaft, said bore being counterbored at one end, a shaft fitting the bore of the pulley, an integral ring fitting said shaft and filling said counterbore and provided with a wedge-shaped gap and secured to the shaft, as by a pin, a wedge-shifting collar fitted to said shaft, a wedge secured to said collar and projecting therefrom along and directly against the shaft into engagement with said gap, and a collar fast on the shaft at the rear of the pulley.

2. In friction-clutches, the combination, substantially as set forth, of a shaft, a friction-ring provided with a wedge-shaped gap and fitting upon the shaft and secured thereto, as by a pin, a wedge-shifting collar fitted to said shaft, a wedge secured thereto and projecting along the shaft into engagement with the gap of the friction-ring, a journal-box engaging the shaft, a collar secured to said journal-box and projecting endwise therefrom, and a pulley provided with a counterbore on each of its hub-faces engaging, respectively, said friction-ring and collar.

3. In friction-clutches, the combination, substantially as set forth, of a shaft, a pulley with a counterbore, a friction-ring provided with a wedge-shaped gap and secured to said shaft and fitting said counterbore, a collar on the shaft opposite the friction-ring, a wedge-shifting collar, and a wedge secured thereto and fitted to slide upon said shaft and engaging the friction-ring with its inner end, said wedge having a transverse notch engaging the notch of the wedge-shifting collar.

WILLIS C. JONES.
WINFIELD S. ROGERS.

Witnesses:
HARRY S. WORTHMAN,
S. B. DEAL.